(12) United States Patent
Broderick et al.

(10) Patent No.: US 7,570,683 B1
(45) Date of Patent: Aug. 4, 2009

(54) WAVEGUIDED LASER CHANNELS FOR A GAS LASER

(75) Inventors: Jeffery A Broderick, Golden, CO (US); John H Doran, Littleton, CO (US); Steven F Garnier, Littleton, CO (US); Chad A Mitchiner, Golden, CO (US)

(73) Assignee: Epilog Corporation, Golden, CO (US)

( * ) Notice: Subject to any disclaimer, the term of this patent is extended or adjusted under 35 U.S.C. 154(b) by 0 days.

(21) Appl. No.: 11/680,441

(22) Filed: Feb. 28, 2007

Related U.S. Application Data

(60) Provisional application No. 60/778,513, filed on Mar. 1, 2006.

(51) Int. Cl.
*H01S 3/22* (2006.01)
(52) U.S. Cl. ............... 372/55; 372/57; 372/35
(58) Field of Classification Search .......... 372/55, 372/57, 35
See application file for complete search history.

(56) References Cited

U.S. PATENT DOCUMENTS

| | | |
|---|---|---|
| 4,064,465 A | 12/1977 | Hundstad |
| 4,169,251 A | 9/1979 | Laakmann |
| 4,438,514 A | 3/1984 | Chenausky |
| 4,446,558 A | 5/1984 | Sepp |
| 4,577,323 A | 3/1986 | Newman |
| 4,703,489 A | 10/1987 | Ross |
| 4,751,715 A | 6/1988 | Henderson |
| 4,779,285 A | 10/1988 | Henderson |
| 4,787,090 A | 11/1988 | Newman |
| 4,807,232 A | 2/1989 | Hart |
| 4,807,234 A | 2/1989 | Hart |
| 4,813,052 A | 3/1989 | DeMaria |
| 4,817,108 A | 3/1989 | Allcock |
| 4,937,838 A | 6/1990 | Kruger |
| 5,079,773 A | 1/1992 | Hart |
| 5,131,003 A | 7/1992 | Mefferd |
| 5,131,004 A | 7/1992 | Dallarosa |

(Continued)

FOREIGN PATENT DOCUMENTS

WO   WO 88/06357   8/1988

OTHER PUBLICATIONS

Brink and Hasson (1978) "High-Power Photopreionization-Stabilized Carbon Dioxide Waveguide Lasers Operating at Gas Pressures of Up to 13 ATM" J. Appl. Phys. 49(4):2250-2253.

(Continued)

*Primary Examiner*—Dung T Nguyen
(74) *Attorney, Agent, or Firm*—Swanson & Bratschun, L.L.C.

(57) ABSTRACT

An RF-excited waveguide laser module comprises a first electrode having a first elongate surface defining in part a waveguide laser channel extending along an optical axis, the first elongate surface having a substantially linear cross-section normal to the optical axis. A second electrode has a second elongate surface defining in part the waveguide laser channel extending along the optical axis. The second elongate surface has a non-linear cross-section normal to the optical axis. A dielectric insert may be provided between the electrodes defining in part the waveguide laser channel. A lengthwise gap may extend essentially an entire length of the waveguide laser channel between one of the first and second electrodes and the dielectric insert. The gap provides fluid communication between the waveguide laser channel and a volume outside the waveguide laser channel.

16 Claims, 6 Drawing Sheets

U.S. PATENT DOCUMENTS

| | | |
|---|---|---|
| 5,140,606 A | 8/1992 | Yarborough |
| 5,271,029 A | 12/1993 | Seiffarth |
| 5,528,619 A | 6/1996 | Bochum |
| 5,881,087 A | 3/1999 | Sukhman |
| 6,192,061 B1 | 2/2001 | Hart |
| 6,195,379 B1 | 2/2001 | Jones |
| 6,198,758 B1 | 3/2001 | Broderick |
| 6,603,794 B2 | 8/2003 | Bethel |
| 6,711,201 B2 | 3/2004 | Vitruk |
| 6,788,722 B1 | 9/2004 | Kennedy |
| 6,798,816 B2 | 9/2004 | DeMaria |
| 6,999,490 B2 | 2/2006 | Kennedy |
| 7,050,475 B2 | 5/2006 | Monty |
| 2005/0018736 A1 | 1/2005 | Kennedy |
| 2005/0105581 A1 | 5/2005 | Seguin |
| 2005/0152425 A1 | 7/2005 | Monty |
| 2005/0175054 A1* | 8/2005 | Shackleton et al. ........... 372/55 |
| 2006/0018357 A1 | 1/2006 | Monty |
| 2006/0029116 A1 | 2/2006 | Shackleton |

OTHER PUBLICATIONS

Smith, et al. (1981) "Traversely Excited Waveguides Gas Lasers" IEEE Journal of Quantum Electronics QE-17(7):1166-1181.

* cited by examiner

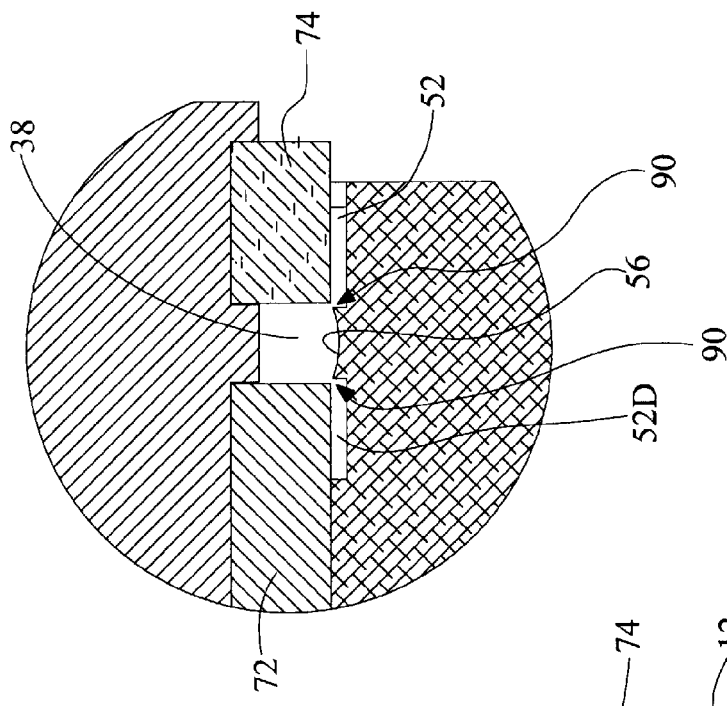
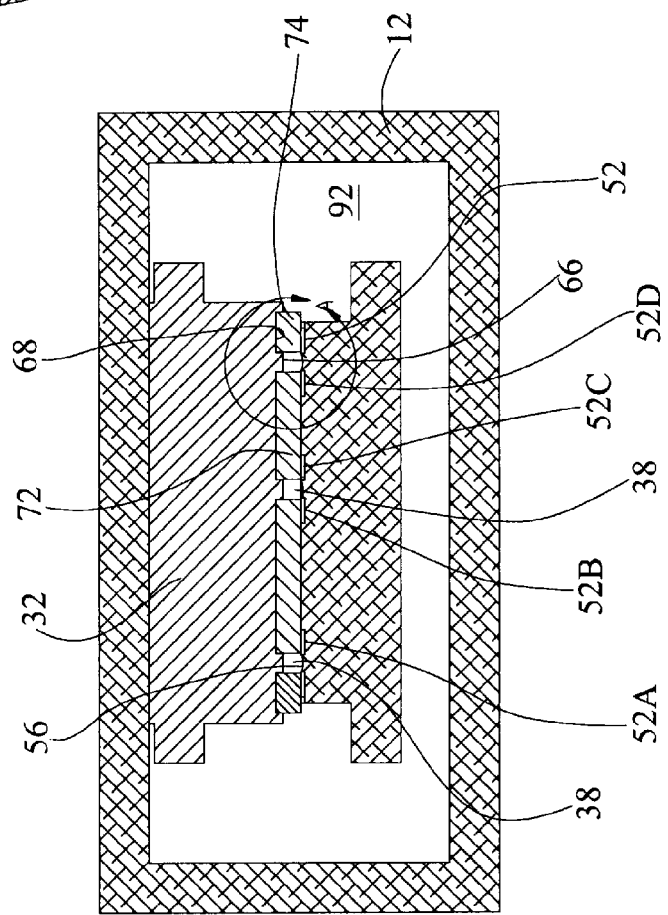
Fig. 6
Fig. 3

WAVEGUIDED LASER CHANNELS FOR A GAS LASER

RELATED APPLICATIONS

This application claims priority from U.S. Provisional Patent Application Ser. No. 60/778,513, filed Mar. 1, 2006, entitled "Improved Method of Assembling RF-Excited Waveguide Gas Lasers and Improved Wave Guiding Laser Channels," which is hereby incorporated by reference.

TECHNICAL FIELD

The present invention is directed to RF-excited waveguide gas lasers and more particularly, to improved waveguide laser channels.

BACKGROUND OF THE INVENTION

RF-excited waveguide gas lasers are finding more applications as their reliability improves and their costs decrease. One of the keys to improving reliability is eliminating the presence of any particles which may intrude in the waveguide laser channels and smash into and damage the laser optics. One typical RF-excited waveguide laser assembly is described in Hart, U.S. Pat. No. 6,192,061. The RF-excited waveguide laser assembly of Hart consists of a pair of electrodes with dielectric waveguide insert sandwiched therebetween. Hart includes a pair of springs 26 which maintain the sandwich assembly in its desired configuration. One problem with a waveguide laser assembly as taught in Hart is the springs 26 as well as the sandwich assembly are slid into a housing interior and the lateral movement between the spring, the sandwiched assembly and the housing interior can generate particles which later can damage the optics in the manner described above.

Yet another problem with existing RF-excited waveguide gas lasers is that harmonic acoustic resonance during pulsed operation within the waveguide laser channels can adversely affect laser performance. Hart, U.S. Pat. No. 6,192,061 teaches providing a number of openings in the waveguide laser channel at positions about where a pressure peak of an acoustic resonance would be located. More particularly, Hart teaches providing such openings at about ¼, ½ and ¾ the lengths of each segment of a waveguide laser channel. These openings are provided substantially transverse to the optical axis of the waveguide laser channels. While such openings may be somewhat effective in diminishing harmonic acoustic resonance by venting gas from the waveguide channel, the openings provide only limited gas venting and fail to provide a suitable exit for particles that may intrude the waveguide laser channels, thus increasing the likelihood that any such particle will damage the waveguide optics.

Yet another known problem with existing RF-exited waveguide gas lasers is the waveguide laser channels are not configured to maximize higher order mode suppression while simultaneously maximizing uniform discharge formation.

The present invention is directed toward overcoming one or more of the problems discussed above.

SUMMARY OF THE INVENTION

A first aspect of the invention is a method of making an RF-excited waveguide laser module that includes sandwiching a dielectric waveguide insert between a first and a second electrode. The dielectric waveguide insert and the first and second electrodes are secured together in a sandwiched configuration to form a waveguide laser assembly. The waveguide laser assembly is inserted into a cavity of a housing without contacting an interior surface of the cavity. The first electrode is then brought into abutment with an inner surface of the cavity in a direction substantially normal to the inner surface of the cavity. The waveguide laser assembly is then secured within the housing cavity with only the first electrode contacting an inner surface of the cavity. In the abutting and the securing steps, substantially no lateral movement occurs between the first electrode and the inner surface of the cavity. The first electrode has a substantially planar surface abutting the inner surface of the cavity and the inner surface of the cavity is likewise planar. The securing step may be accomplished by providing a plurality of holes in the wall of the housing defining the inner surface of the housing and providing a corresponding plurality of internally threaded holes in the first electrode. These holes are aligned and screws are inserted to secure the waveguide laser assembly within the housing.

A second aspect of the invention is an RF-excited waveguide gas laser module comprising a first electrode having a first elongate surface defining in part a waveguide laser channel extending along an optical axis, the first elongate surface having a substantially linear cross-section normal to the optical axis. A second electrode having a second elongate surface defining in part the waveguide laser channel also extends along the optical axis. The second elongate surface has a non-linear cross section normal to the optical axis. In one embodiment, non-linear cross-section may be arcuate. In one embodiment, the non-linear surface is concave and has a distance between a bottom of the concave surface and a top of the surface of between about 0.005-0.03 inch, which equates to a radius of between about 0.0825-0.4 inch. A dielectric insert may be provided between the electrodes and in part define the waveguide laser channel. A lengthwise gap may extend essentially an entire length of the waveguide laser channel between one of the first and second electrodes and the dielectric insert with the gap providing fluid communication between the waveguide laser channel and a volume outside the waveguide.

Yet another aspect of the invention is a waveguide gas laser comprising a first electrode and a second electrode. A dielectric insert is sandwiched between the ground electrode and the active electrode. A waveguide channel is defined by at least one of the dielectric insert, the active electrode and the ground electrode. A lengthwise gap extends essentially an entire length of the waveguide laser channel, the lengthwise gap providing fluid communication between the waveguide laser channel and a volume outside the waveguide laser channel.

Yet another aspect of the invention is a first electrode having a first elongate surface defining in part a waveguide laser channel extending along an optical axis. A second electrode has a second elongate surface defining in part the waveguide laser channel extending along the optical axis. A dielectric insert is sandwiched between the first and second electrodes, the dielectric insert comprising an elongate slot extending along the optical axis having side walls defining in part the waveguide laser channel. A lengthwise gap extends essentially an entire length of the waveguide laser channel between at least one of the first and second electrode surfaces and the dielectric insert, the gap providing fluid communication between the waveguide laser channel and a volume outside the waveguide laser channel.

The RF-excited waveguide gas laser module in accordance with the present invention has a waveguide channel which maximizes higher order mode suppression and maximizes uniform discharge formation. The waveguide channel in accordance with the present invention further provides excellent gas venting to eliminate acoustical distortion. The elongate gaps incorporated into the waveguide channel provide a particle exit out of the waveguide channel to minimize the likelihood of damage to the laser optics in the event a particle intrudes into the waveguide channel. The metal to metal electrode surfaces found on opposing sides of the waveguide channel provide good plasma breakdown. These many advantages are provided in an RF-excited waveguide gas laser module that can be efficiently assembled from conventional materials. The assembly method described herein minimizes the chance of particle formation, enhancing reliability and service lifetime. The higher reliability greatly enhances the economic viability of the RF-excited waveguide gas laser module.

BRIEF DESCRIPTION OF THE DRAWINGS

FIG. 3 is a cross-section of the RF-excited waveguide gas laser of FIG. 1 taken along line AA of FIG. 1;

FIG. 6 is an enlarged portion of wave guiding laser channel illustrated in FIG. 3;

DETAILED DESCRIPTION OF THE INVENTION

Figure 1:
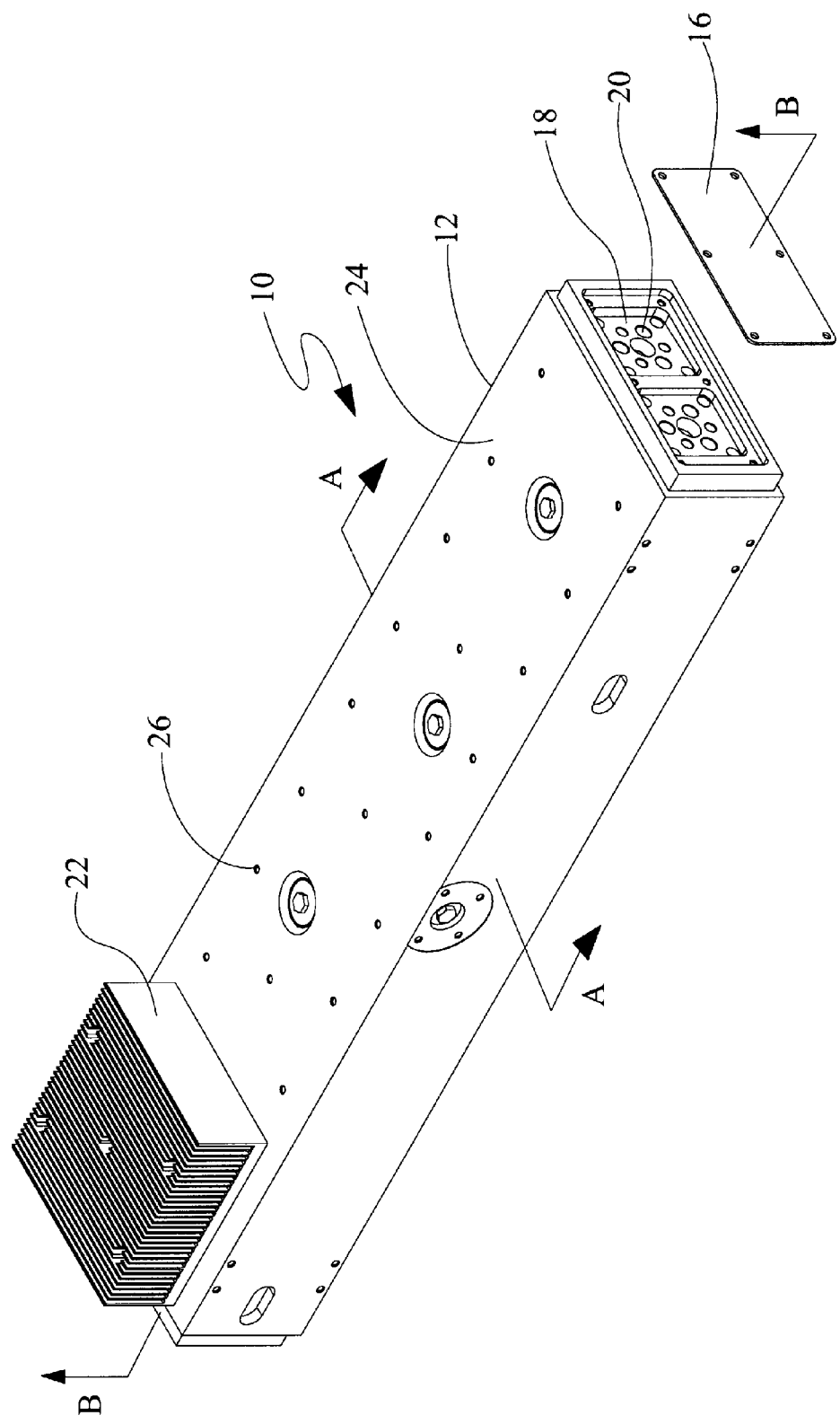
FIG. 1 is a perspective view of a partially assembled RF-excited waveguide gas laser module in accordance with the present invention.

A partially assembled RF-excited waveguide gas laser module 10 is illustrated in FIG. 1. The module 10 comprises a housing 12 containing a waveguide laser assembly 14 shown exploded in FIG. 2. An end panel 16 is shown removed from the housing to reveal optic adjustment plates 18 having holes 20 for accessing optics adjustment screws as known in the art. A heat sink 22 is shown attached in abutment to a top surface 24 of the housing 12. Screw holes 26 are also provided in the top surface 24 of the housing 12 for attaching other heat sinks, which are not shown for the sake of clarity.

Figure 2:
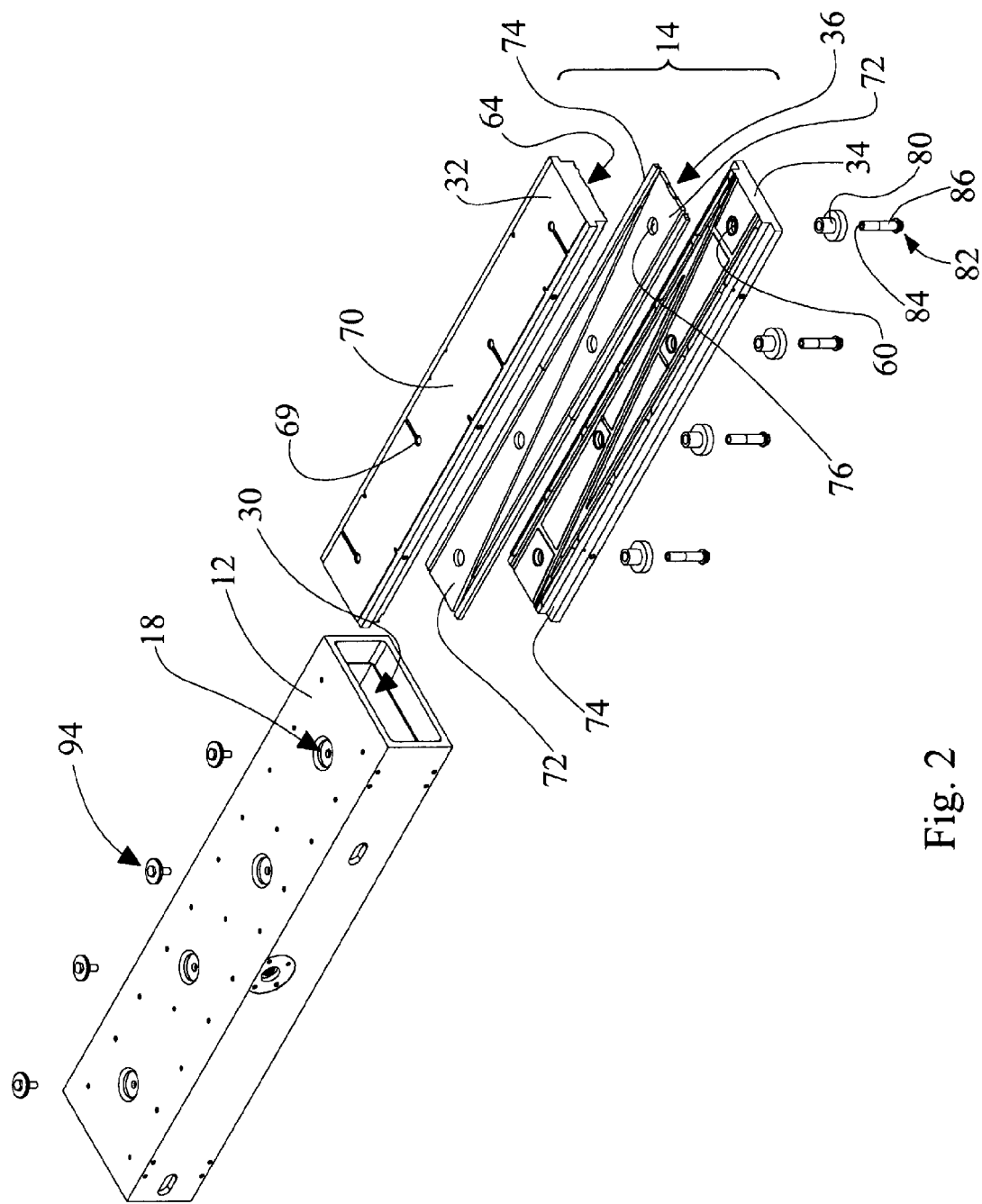
FIG. 2 is an exploded view of the RF-excited waveguide gas laser module and waveguide laser assembly of FIG. 1.
Figure 4:
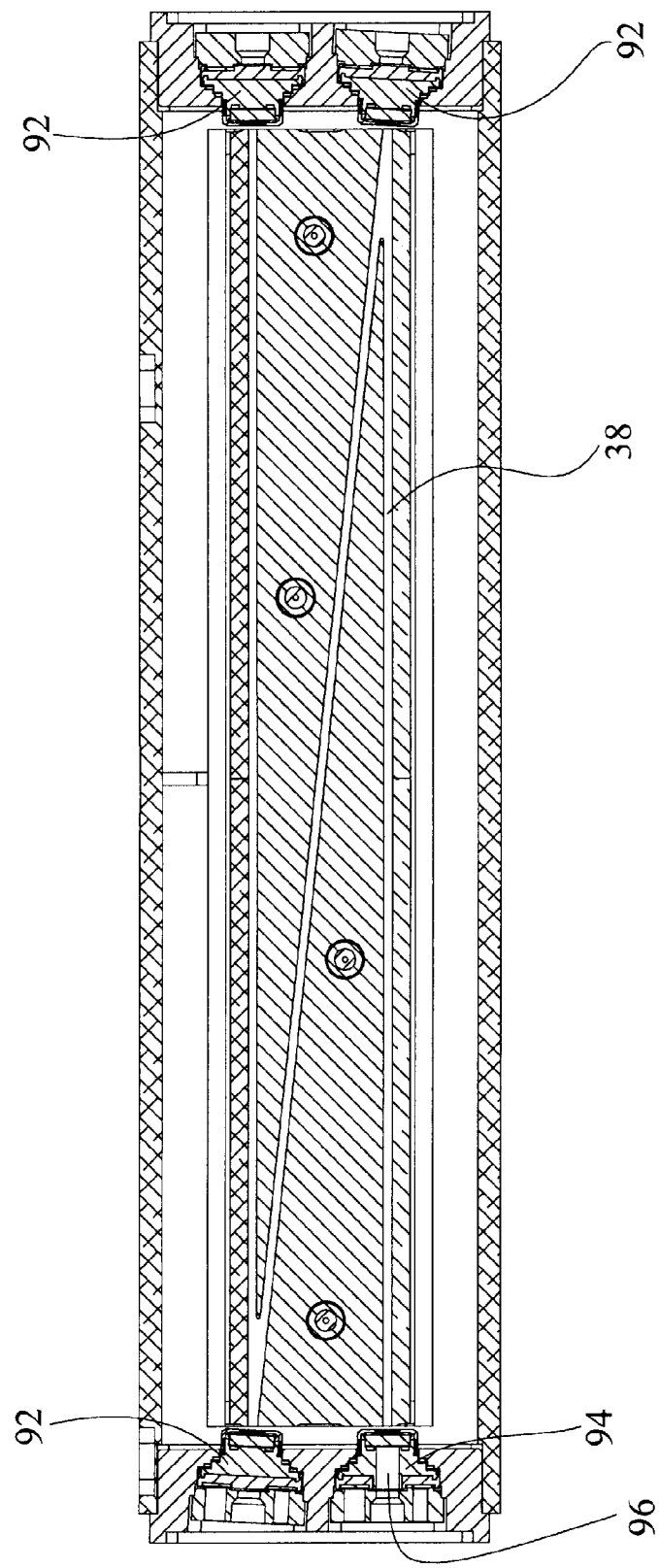
FIG. 4 is a cross-section of the RF-excited waveguide gas laser of FIG. 1 taken along line BB of FIG. 1.

Referring to FIG. 2, the waveguide laser assembly 14 is shown exploded and removed from a cavity 30 of the housing 12. The waveguide laser assembly 14 comprises a first electrode 32, a second electrode 34 and a dielectric insert assembly 36. Either or both electrodes could be active or "hot". However, in the embodiment discussed herein the second electrode is the active electrode and the first electrode is a ground electrode. Once assembled in a sandwiched configuration which will be described in greater detail below, the first electrode 32, the second electrode 34 and the dielectric insert assembly 36 collectively define a Z-shaped waveguide laser channel 38 which is best viewed in FIG. 4. While a Z-shaped channel 38 is expressly disclosed, other configurations or courses of the channel could be substituted and are considered within the scope of the invention. Some such configurations, which include a "bowtie," a "W" and a "WI," are shown in Hart, U.S. Pat. No. 6,192,061, the disclosure of which is hereby incorporated herein by reference.

Figure 5:
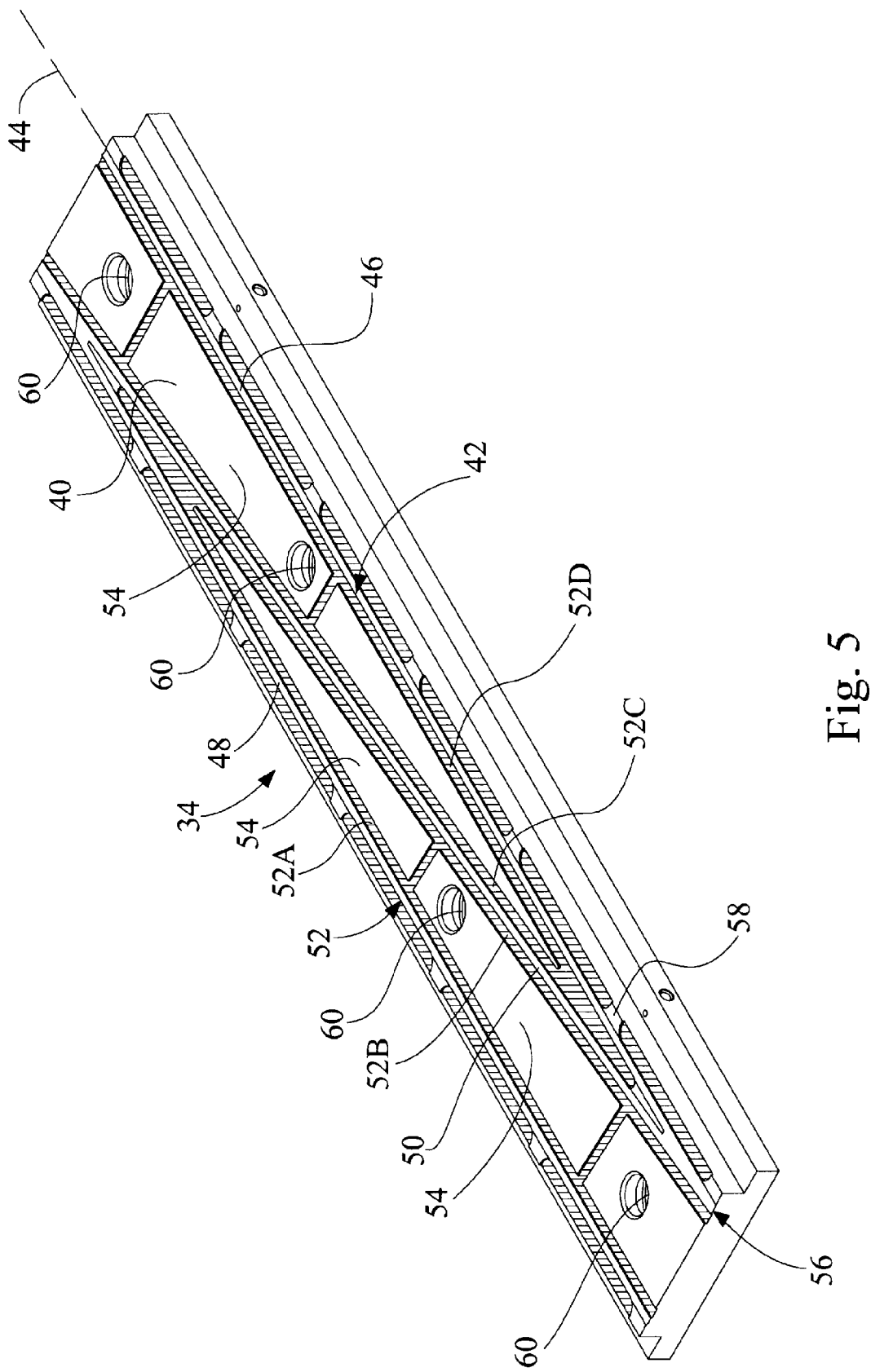
FIG. 5 is a perspective view of the active electrode of the present invention.
Figure 7:
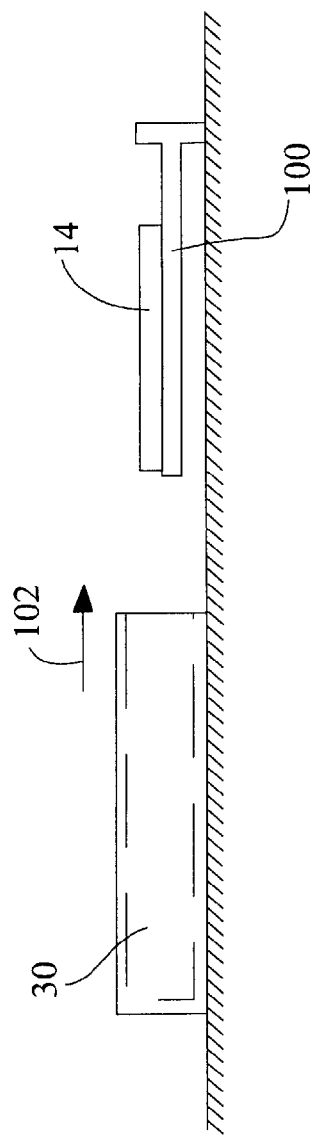
FIG. 7 is a schematic representation of a jig for supporting the waveguide laser assembly for insertion into a cavity of a housing without contacting an inner surface of the cavity.

Referring to FIG. 5, the second or active electrode 34 is integrally formed from a suitable conductive material, which may, for example, be a metal such as aluminum, titanium, gold, platinum, or a titanium-aluminide alloy. The top surface 40 of the second electrode 34 has a number of structures formed (e.g. machined) therein. These structures include an elongate waveguide surface 42 that extends lengthwise of the second electrode 34 along an optical axis 44 of a waveguide channel forming in part by the elongate waveguide surface 42. As seen in FIG. 5, the elongate waveguide surface 42 is substantially Z-shaped with two parallel legs 46, 48 and a transverse leg 50. Also formed in the top surface 40 of the second electrode 34 are elongate vents 52 extending essentially the entire length of the elongate waveguide surface 42 on both sides thereof. The elongate vents 52 are illustrated by hash marks in FIG. 5 for the sake of clarity. "Essentially the entire length" means to the extent possible by design limitations. For example, the interior elongate vents 52A-D extend the entire length, but supports 58 are provided across the outer vents to support portions of a dielectric insert. These vents 52 may be formed by machining material from the top surface 40 of the second electrode 34. Transverse vents 54 extend between interior elongate vents 52A-52D to allow for exchange of gas between the interior vents 52A-D and a volume outside the waveguide laser channel. The elongate waveguide surface 42 has a non-linear section normal to the optical axis which can be viewed at 56 in FIG. 5 and is perhaps best viewed at 56 in FIGS. 3 and 6. Referring to FIG. 6, the non-linear cross-section 56 may be arcuate or concave. The radius is chosen to eliminate higher order modes while not creating an excessively non-uniform field. In one embodiment, a radius of between about 0.4-0.0825 inch has satisfied both requirements. Also defined in the top surface 40 of the second electrode 34 are a number of insert supports 58 adjacent to the parallel legs 46, 48 of the elongate waveguide surface 42 spaced lengthwise of the parallel legs 46, 48. The second electrode 34 also includes a number of assembly holes 60 which extend between the top surface 40 and a bottom surface of the second electrode 34.

The first or ground electrode 32 is typically made of the same materials discussed with respect to the second electrode and likewise has a bottom surface 64 into which an elongate waveguide surface 66 is formed, as best viewed in FIGS. 3 and 6. Also formed in the bottom surface 64 of the first electrode 32 are dielectric insert channels 58 which extend lengthwise of parallel legs corresponding to the parallel 46, 48 of the elongate waveguide surface of the second electrode 34. A number of screw holes 69 extend through the ground electrode 32 from the planar top surface 70.

The dielectric insert assembly 36 consists of four pieces. These pieces include two substantially symmetric triangular dielectric inserts 72 and two rail dielectric inserts 74. Each of the triangular dielectric inserts include alignment holes 76 to align with the assembly holes 60 of the second electrode 34 and the screw holes 69 of the first electrode 32 as illustrated in FIG. 2. As seen in FIG. 2, the dielectric insert assembly 36 is constructed and arranged to define side walls of the Z-shaped waveguide channel 38, as can also be viewed in FIGS. 3, 4 and 6. The dielectric insert pieces can be made from a number of dielectric materials, for example, an alumina ceramic.

The waveguide laser assembly 14 is assembled by inserting the rail dielectric inserts 74 into the dielectric insert channels 68 in the first electrode 32 and aligning the assembly holes 60 of the second electrode 34 with the alignment holes 76 of the triangular dielectric inserts 72 substantially as illustrated in FIG. 2. Ceramic bushings 80 are inserted in each of the aligned assembly holes 60 and alignment holes 76 then a screw 82 which has an inner threaded shaft bore 84 in an exteriorly threaded shaft 86 is received in a hole in the ceramic bushing 80 and threadably engages threaded holes 69 in the bottom surface of the first electrode which are aligned with the assembly holes 60 and the alignment holes 76. Once tightened, the screws 82 secure the wave guide laser assembly 14 in a sandwiched configuration with the Z-shaped waveguide channel defined by the non-linear elongate waveguide surface 42 of the second electrode, the elongate waveguide surface 66 of the first electrode and the side walls of the triangular dielectric inserts 72 and rail dielectric inserts 74, as is perhaps best viewed in FIGS. 3 and 6. On one embodiment, the Z-shaped waveguide channel has essentially a square cross-section normal to the optical axis, with the distance between the electrodes being about 0.1 inch and the distance between the dielectric side walls being about 0.1 inch. The waveguide surface of the non-linear waveguide has a radius of between about 0.0825-0.4 inch, or distance of between about 0.03-0.005 inch between the bottom and top of arcuate surface.

With further reference to FIGS. 3 and 6, in particular to FIG. 6, an elongate gap provides fluid communication between the Z-shaped waveguide channel 38 and a volume outside the waveguide channel 38. More particularly, the gap 90 extends between each vent 52A-D and the Z-shaped waveguide channel 38. This gap allows gas to flow between the Z-shaped waveguide channel 38 and the vents 52 to communicate with a volume 92 within the interior of the housing 12. In this manner, harmonic acoustic resonance is eliminated within the Z-shaped waveguide channel 38. In addition, the gaps 90 provide an opportunity for any particles which enter the Z-shaped waveguide channel 38 to exit the Z-shaped waveguide channel 38 before striking one of the lasing optics. In essence, the elongate gaps communicating with the vents 52, 52A-D, combine the advantages of a free space laser with those of a waveguide laser. In one embodiment, the gap is between about 0.05-0.01 inch.

Once the waveguide laser assembly 14 is assembled as described above, the waveguide laser assembly 14 is inserted into the housing 12 without contacting any interior surface of the cavity 30. The waveguide laser assembly is inserted so as to bring the holes 69 into alignment with the holes 18 through a top surface 24 of the housing 12. The top surface 70 of the first electrode 32 is then brought into abutment in a direction substantially normal to an inner top surface of the cavity 30. "Substantially normal" means there is substantially no lateral movement relative to the inner surface of the top of the housing and the top surface 70 of the first electrode which could scratch either surface creating particles. This may be accomplished by the screws 94 threadably engaging the inner threaded bore 84 of the screws 82. In any event, once in abutment and properly aligned, the screws 94 are tightened to provide tight abutment between the top surface of the first electrode and the top surface of the cavity 30 to promote efficient conduction of heat therebetween, grounding of the first electrode to the housing, and to prevent any relative movement therebetween. Referring again to FIG. 2, the holes 18 are countersunk so that the heads of the screws 94 once engaged with the waveguide laser assembly 14 lie below the plane of the top surface 24 of the housing 12. In this manner, the heat sinks 22 have maximum surface contact with the top surface 24 of the housing 12 to maximize efficient conduction of heat to the heat sinks 22.

Referring again to FIG. 4, mirrors 92 are provided to longitudinally delimit the Z-shaped channel. A dielectric mirror 94 is provided at one end of the Z-shaped waveguide channel 38 to allow emission of a laser beam through the optical channel 96 in a manner known to those of skill in the art. Collimating and focusing optics, not shown, are optically coupled to the optical channel 96.

The RF-excited wave guide laser module 10 is assembled so that it is vacuum tight and once evacuated it can be filled with a gas mixture including $CO_2$. The mirrors 92 and dielectric mirror 94 can then be aligned using the alignment screws accessible through the holes 20 in a conventional manner.

The waveguide laser assembly 14 may be inserted into the cavity 30 of the housing 12 without contacting the inner surface by use of a jig 100 upon which the waveguide laser assembly 14 rests and then moving the housing 12 in the direction of the arrow 102 to insert the waveguide laser assembly 14 within the cavity 30. Thereafter, the inner threaded bores 84 of the screws 82 are aligned with the assembly holes 18 and the screws 94 are brought into enthreaded engagement with the inner threaded bore 84 of the screws 82 as discussed above. Other ways of loading the waveguide laser assembly into the cavity without contacting the interior are also within the scope of the invention.

While not illustrated in the drawings, those of skill in the art will understand that an electric supply line will electrically communicate the second or active electrode with a power source that provides an alternating electric current at a frequency preferably in the radio frequency range of the spectrum, so that the second electrode 34 and to the first electrode 32 form a capacitance, and laser excitation takes place in the Z-shaped waveguide channel 38. Inductor coils may be provided in electrical parallel with one another and parallel to the aforementioned capacitance for distribution of inductance over the length of the waveguide laser assembly as needed for efficient operation of the RF-excited waveguide gas laser module.

Figure 8:
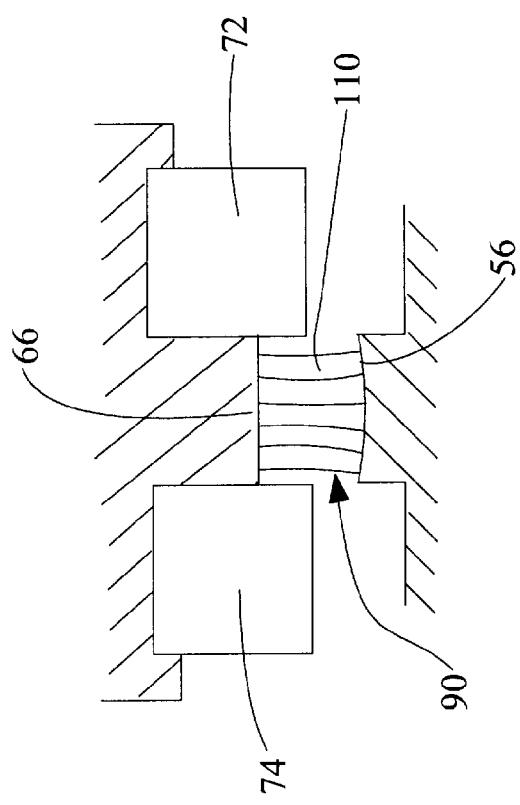
FIG. 8 is a schematic representation of the RF field formed within the waveguide channel of the present invention.

Referring to FIG. 8, by having the non-linear cross-section waveguide surface 56 of the active electrode and the linear waveguide surface 66 of the ground electrode defining in part the Z-shaped waveguide channel 38, an even electrical field distribution illustrated by the field lines 110 results which maximizes a good discharge formation and promotes order mode suppression, thereby improving efficiency and the quality of the wave form. The gaps 90, by virtue of being located at a point of minimal field strength, have a minimal effect on the discharge formation. The gaps are also located at the point of lowest optical gain to minimize optical loss. Without being bound by theory, the metal to metal electrode surfaces are believed to facilitate electron transfer, promoting good plasma breakdown.

It should be understood any references made herein with respect to directions and relative locations are intended solely for explanatory purposes in connection with the orientation of the laser components as depicted in the drawings. However, other orientations of the components may be used in applications of the invention disclosed herein.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims.

What is claimed is:

1. A waveguide laser gas laser comprising:
   a first electrode;
   a second electrode;
   a dielectric insert sandwiched between the first electrode and the second electrode, the dielectric insert comprising an elongate slot defining side walls;
   a waveguide channel having a length defined by the side walls of the elongate slot of the dielectric insert, the first electrode and the second electrode; and
   a lengthwise gap extending essentially the entire length of the waveguide laser channel between a side wall and an electrode, the lengthwise gap providing fluid communication between the waveguide laser channel and a volume outside the waveguide laser channel.

2. The waveguide laser of claim 1 further comprising the first and second electrodes and the elongate slot of the dielectric defining a waveguide laser channel comprising at least two linear segments with an angle therebetween.

3. The waveguide laser of claim 1 further comprising the first and second electrode and the elongate slot of the dielectric defining a Z-shaped waveguide laser channel.

4. The waveguide laser of claim 1 further comprising the lengthwise gap being situated between a distal end of one of the first and second electrodes and a side wall of the dielectric insert.

5. The waveguide laser of claim 1 further comprising the second electrode being an active electrode and the lengthwise gap being situated between a distal end of the second electrode and a side wall of the dielectric insert.

6. The waveguide laser of claim 1 further comprising a pair of lengthwise gaps extending essentially an entire length of the waveguide laser channel.

7. The waveguide laser of claim 5 further comprising a pair of lengthwise gaps, with each lengthwise gap on an opposite side of the second electrode.

8. The waveguide laser of claim 7 wherein the second electrode has a concave surface opposite the first electrode.

9. The waveguide laser of claim 1 wherein the lengthwise gap is formed at a point where a side wall and an electrode would intersect.

10. A waveguide gas laser comprising:
    a first electrode having a first elongate surface defining in part a waveguide laser channel extending along an optical axis;
    a second electrode having a second elongate surface opposite the first elongate surface defining in part the waveguide laser channel extending along the optical axis;
    a dielectric insert sandwiched between the first and second electrode, the dielectric insert comprising an elongate slot extending along the optical axis having side walls defining in part the waveguide laser channel; and
    at least one lengthwise gap extending essentially an entire length of the waveguide laser channel between one of the first and second electrode surfaces and the dielectric insert, each gap providing fluid communication between the waveguide laser channel and a volume outside the waveguide laser channel.

11. The waveguide laser of claim 10 further comprising the first and second elongate surfaces and the elongate slot comprising at least two linear segments with an angle therebetween.

12. The waveguide laser of claim 10 further comprising the first and second elongate surfaces and the elongate slot defining a Z-shaped waveguide laser channel.

13. The waveguide laser of claim 10 further comprising the second electrode being an active electrode and each lengthwise gap being situated between the second elongate surface and a side wall of the elongate slot of the dielectric insert.

14. The waveguide laser of claim 13 further comprising a pair of lengthwise gaps on opposite sides of the second electrode.

15. The waveguide laser of claim 13 wherein the second surface of the second electrode has a concave cross-section.

16. The waveguide laser of claim 10 wherein the lengthwise gap is formed at a point where a side wall and an electrode would intersect.

\* \* \* \* \*